United States Patent
Ikeyama

(10) Patent No.: US 8,178,023 B2
(45) Date of Patent: May 15, 2012

(54) METHOD FOR MANUFACTURE OF HOUSING PART PROVIDED WITH VENTILATION FILTER, AND METHOD FOR MANUFACTURE OF HOUSING PROVIDED WITH VENTILATION FILTER

(75) Inventor: Yoshiki Ikeyama, Osaka (JP)

(73) Assignee: Nitto Denko Corporation, Osaka (JP)

( * ) Notice: Subject to any disclaimer, the term of this patent is extended or adjusted under 35 U.S.C. 154(b) by 306 days.

(21) Appl. No.: 12/086,035

(22) PCT Filed: Nov. 15, 2006

(86) PCT No.: PCT/JP2006/322751
§ 371 (c)(1),
(2), (4) Date: Jun. 3, 2008

(87) PCT Pub. No.: WO2007/066477
PCT Pub. Date: Jun. 14, 2007

(65) Prior Publication Data
US 2009/0267252 A1    Oct. 29, 2009

(30) Foreign Application Priority Data
Dec. 8, 2005 (JP) ................. 2005-354954

(51) Int. Cl.
*B29C 45/14* (2006.01)
(52) U.S. Cl. .............. 264/271.1; 264/274; 264/275
(58) Field of Classification Search ............ 264/274, 264/275, 271.1; 425/110, 112, 127, 129.1
See application file for complete search history.

(56) References Cited

U.S. PATENT DOCUMENTS
| | | | |
|---|---|---|---|
| 5,914,415 A | 6/1999 | Tago | |
| 6,149,010 A * | 11/2000 | Tanaka et al. | 206/714 |
| 2004/0063360 A1 * | 4/2004 | Kikuchi | 439/736 |

FOREIGN PATENT DOCUMENTS
| | | |
|---|---|---|
| JP | 2001-168543 A | 6/2001 |
| JP | 3219700 B | 8/2001 |
| JP | 2002-039394 A | 2/2002 |
| JP | 2002-347068 | 12/2002 |
| JP | 2005-011587 A | 1/2005 |

OTHER PUBLICATIONS
Notification of Reasons for Refusal issued in corresponding Japanese Application No. 2005-354954 and mailed Apr. 6, 2010, with its English translation, 4 pages.

* cited by examiner

*Primary Examiner* — Joseph Del Sole
*Assistant Examiner* — James Sanders
(74) *Attorney, Agent, or Firm* — Hamre, Schumann, Mueller & Larson, P.C.

(57) ABSTRACT

A ventilation filter part 19 including a support body 27 and a ventilation filter 25 fixed to the support body 27 is disposed in a concave portion 44c in a stationary die 44. A movable die 40 is brought into close proximity to the stationary die 44 and these dies are clamped together. Resin is injected into a cavity CV defined therebetween as a result of the clamping to make the injected resin and the ventilation filter part 19 into one piece. A housing upper portion 13 (housing part) formed of the ventilation filter part 19 and the injected resin is thus molded.

12 Claims, 9 Drawing Sheets

METHOD FOR MANUFACTURE OF HOUSING PART PROVIDED WITH VENTILATION FILTER, AND METHOD FOR MANUFACTURE OF HOUSING PROVIDED WITH VENTILATION FILTER

TECHNICAL FIELD

The present invention relates to a method for manufacture of a housing part that becomes part of a housing provided with a ventilation filter. The invention also relates to a method for manufacture of a housing provided with a ventilation filter using a housing part manufactured by this method.

BACKGROUND ART

For example, a ventilation hole for adjusting an internal pressure is provided to the housing of an ECU (Electronic Control Unit) in an automobile in order to prevent the internal pressure from rising excessively. It is normal for such a ventilation hole to have a measure to prevent the entry of foreign matter, such as dust and water droplets, into the interior of the housing.

For instance, a housing in which a ventilation filter provided with a reinforcing member is attached directly to the ventilation hole is disclosed in JP 2001-168543A. A housing in which a ventilation filter part formed by fixing a ventilation filter to a support body is fit in the ventilation hole is disclosed in Japanese Patent No. 3219700.

In the former case, the ventilation filter is attached to the ventilation hole of the housing by means of heat welding or with the use of an adhesive. However, because the ventilation filter can be damaged at the time of attachment or attached insufficiently, an inspection to confirm the reliability (mainly, the water resistance) is conducted after the attachment. The inspection, however, has to be conducted on large housings as a whole and there is a disadvantage that the inspection apparatus becomes larger. Moreover, in the event of production of an inferior article that failed the inspection, such an article has to be discarded with the whole housing, which is quite wasteful.

In the latter case, because the inspection can be conducted at a stage where a ventilation filter part is formed by fixing the ventilation filter to the support body made of resin, the inspection itself is easy. However, in a case where a method for fitting the ventilation filter part in the housing is adopted, it is essential to devise a configuration such that improves the sealing performance or a configuration such that prevents the ventilation filter part from falling off from the housing. One of the options is to make the ventilation filter part and the housing into one piece by means of heat welding or ultrasonic welding. However, the ventilation filter possibly may be damaged during the application of heat welding or ultrasonic welding.

DISCLOSURE OF THE INVENTION

In view of the circumstances as above, an object of the invention is to provide a method for enabling a housing part provided with a ventilation filter to be manufactured easily in a reliable manner. The invention also provides a method for manufacture of a housing provided with a ventilation filter using a housing part provided with a ventilation filter manufactured by this method.

More specifically, a preferred aspect of the invention provides a method for manufacture of a housing part provided with a ventilation filter, including: a step (A) of disposing a ventilation filter part including a support body and a ventilation filter fixed to the support body in a forming die at a predetermined position and clamping the forming die; and a step (B) of injecting resin into a cavity defined within the forming die as a result of clamping to make the resin and the ventilation filter part into one piece and thereby molding a housing part formed of the ventilation filter part and the resin.

In the preferred aspect of the invention, it is possible to use a ventilation filter part in which the ventilation filter is in the form of a membrane and the support body is in the form of a frame to which a peripheral portion of the ventilation filter is fixed. In the step of molding, it is possible to clamp the forming die in such a manner that the forming die comes into close contact with top and bottom faces of the support body so as to prevent the resin from flowing over a ventilation region of the ventilation filter.

In another aspect, the invention provides a method for manufacture of a housing provided with a ventilation filter, including manufacturing a housing part provided with a ventilation filter by the method described above and completing a housing provided with a ventilation filter by assembling the housing part provided with a ventilation filter and another housing part.

The method for manufacture of the invention is based on a so-called insert injection molding method, by which resin is molded while a ventilation filter part is inserted in a forming die. According to this method, because the injected resin fills the periphery of the ventilation filter part without any clearance, it is possible to ensure high sealing performance readily and easily in comparison with the conventional fitting method. In addition, it is necessary to devise a configuration to prevent the ventilation filter part from falling off from the housing in the case of adopting the fitting method. However, according to the method of the invention, such a configuration is essentially unnecessary. In addition, because the method of the invention does not use tools, such as a heat welding tool or an ultrasonic horn, the ventilation filter is hardly damaged. As has been described, according to the method for manufacture of the invention, it is possible to manufacture a housing part provided with a ventilation filter easily in a reliable manner. Also, because the step of molding a housing and a step of fixing the ventilation filter part to the housing are performed substantially at the same time, an improvement in productivity achieved owing to the fewer steps, and hence a reduction of the product costs, can be expected.

Further, in the invention, a ventilation filter part is manufactured before the step of forming the housing part. Hence, it is possible to conduct a step (C) of discriminating between conforming articles and inferior articles by conducting an inspection, such as a water resistance inspection, on the products at a stage where the ventilation filter parts are manufactured. Accordingly, those determined as conforming articles alone are used as the ventilation filter part in the steps (A) and (B). When configured in this manner, there is no need to conduct an inspection after the housing part is manufactured. Hence, wasting of materials and labors in the event of a problem, such as damage done on the ventilation filter, can be reduced to the least extent possible.

BEST MODE FOR CARRYING OUT THE INVENTION

Hereinafter, embodiments of the invention will be described with reference to the accompanying drawings.

Figure 1:
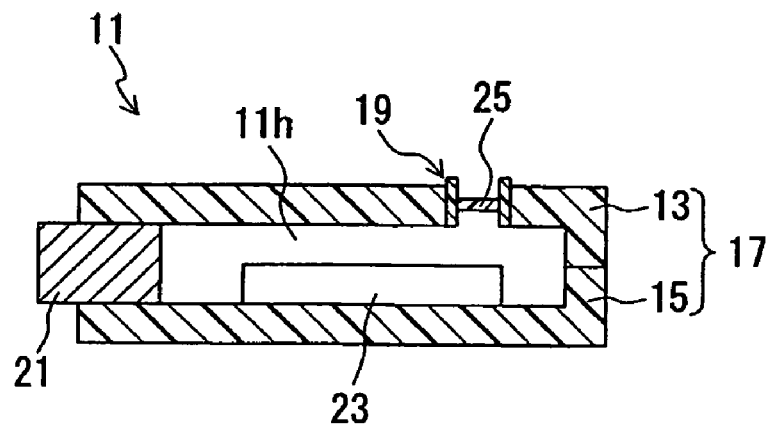
FIG. 1 is a cross section of an ECU using a housing provided with a ventilation filter.

FIG. 1 shows an ECU in an automobile equipped with a housing provided with a ventilation filter manufactured by a method of the invention. An ECU 11 includes an ECU main body 23 having electronic parts and a wiring board, and a housing 17 provided with a ventilation filter. A connector 21 that enables reception and transmission of an electric signal between the ECU main body 23 and the external is exposed from the side face portion of the housing 17 provided with a ventilation filter.

The housing 17 provided with a ventilation filter is formed of two portions (plural portions), that is, a housing upper portion 13 including a ventilation filter part 19 (a housing part provided with a ventilation filter) and a housing lower portion 15 (the other housing portion) combined with the housing upper portion 13. The housing upper portion 13 and the housing lower portion 15 are joined to each other without any clearance in between with the use of a sealing material or an adhesive. A space between the connector 21 and the housing 17 provided with a ventilation filter also is sealed. A space 11h within the housing 17 provided with a ventilation filter enables ventilation between the interior and the exterior via the ventilation filter part 19. In this embodiment, both the housing upper portion 13 and the housing lower portion 15 are made of resin. However, the housing lower portion 15 that does not include the ventilation filter part 19 may be made of metal.

Figure 2:
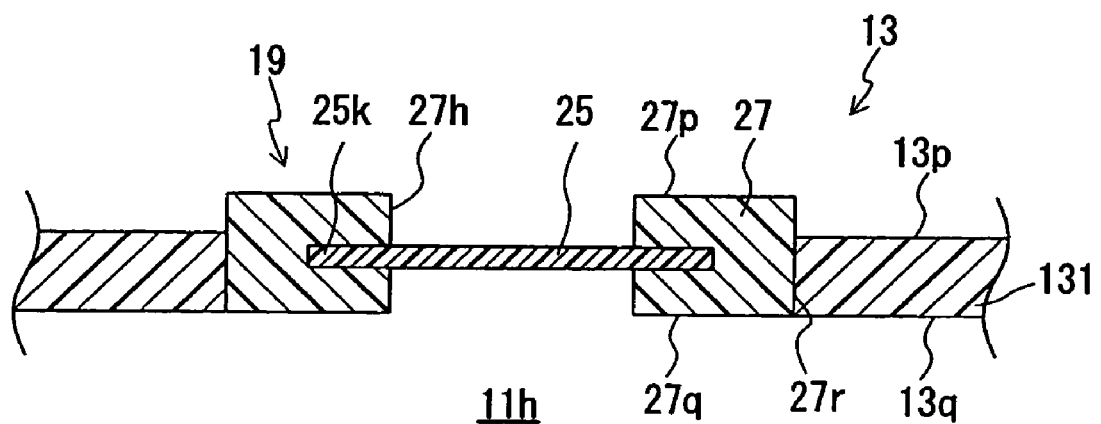
FIG. 2 is a partial enlarged cross section of the housing provided with a ventilation filter of FIG. 1.
Figure 3:
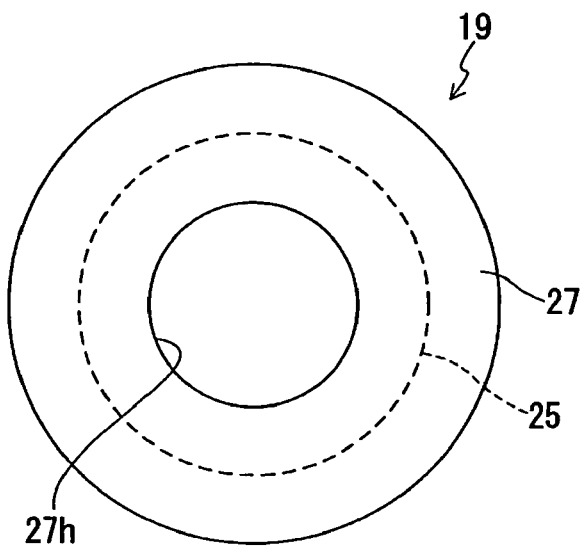
FIG. 3 is a plan view of a ventilation filter part.

FIG. 2 is a partial enlarged cross section of FIG. 1. FIG. 3 is a plan view of a ventilation filter part shown in FIG. 2. As is shown in FIG. 2, the ventilation filter part 19 includes a ventilation filter 25 and a support body 27 that fixes the ventilation filter 25 by sandwiching the peripheral portion 25k thereof from above and below. As is shown in the plan view in FIG. 3, the ventilation filter 25 is of a disc shape. The support body 27 is of a ring shape having an inside diameter smaller than the diameter of the ventilation filter 25 and an outside diameter larger than the diameter of the ventilation filter 25. Part of the ventilation filter 25 is exposed within an opening 27h of the support body 27, and the peripheral portion 25k of the ventilation filter 25 is embedded in the support body 27. The shapes of the ventilation filter 25 and the support body 27 are not particularly limited to those specified above. For example, it is possible to adopt a ventilation filter part formed of a square ventilation filter and a frame-shaped support body to which the peripheral portion of the ventilation filter is fixed.

As is shown in FIG. 2, the ventilation filter part 19 is made integral with a wall portion 131, which is a portion of the housing upper portion 13 other than the ventilation filter part 19. To be more specific, the support body 27 is made integral with the wall portion 131 at the side face 27r alone. The bottom face 27q of the support body 27 and the inner surface 13q of the wall portion 131 are almost flush with each other, whereas there is a step at the boundary between the top face 27p of the support body 27 and the outer surface 13p of the wall portion 131. When fixed in the form as above, it is possible to make the housing upper portion 13 thinner. It should be noted, however, that the support body 27 may be made integral with the wall portion 131 at the entire side face 27r. In such a case, it is possible to reduce an amount of protrusion of the ventilation filter part 19 in the outward direction by making the top face 27p of the support body 27 and the outer surface 13p of the wall portion 131 almost flush with each other.

The ventilation filter 25 is in the form of a membrane that allows the permeation of a gas and inhibits the permeation of a liquid. To be more specific, as the ventilation filter 25, it is possible to use a porous membrane made of fluorocarbon resin or polyolefin resin solely or a composite formed by assembling the porous membrane and a reinforcing member.

Porous membranes suitable to the ventilation filter 25 are preferably porous membranes made of fluorocarbon resin due to its excellent liquid repellency. In particular, porous membranes made of polytetrafluoroethylene (PTFE) are preferable. Porous membranes made of fluorocarbon resin also are excellent in chemical resistance. Porous membranes made of PTFE can be formed by molding and rolling paste containing PTFE particles followed by drawing.

Liquid-repellent treatment (water-repellent treatment and/or oil-repellent treatment) may be applied on the porous membrane. The liquid-repellent treatment can be carried out by applying a substance with small surface tension on the porous membrane followed by drying and then curing. As a liquid-repellent agent used in the liquid-repellent treatment, for example, a solution containing a polymer material having perfluoroalkyl groups can be used. The liquid-repellent agent can be applied on the porous membrane by means of impregnation and spraying, which are typical techniques for the liquid-repellent treatment.

The thickness of the porous membrane is not particularly limited. However, it is normally in a range of 50 µm to 10 mm. The porosity and an average pore diameter of the porous membrane are not particularly limited, either. However, in order to form the ventilation filter 25 through which a liquid does not permeate substantially, it is sufficient for the average pore diameter to be, for example, in a range of 0.01 µm to 10 µm, and more preferably, in a range of 0.5 µm to 5 µm. Also, it is sufficient for the porosity to be, for example, in a range of 10% to 90%, and more preferably, in a range of 30% to 80%.

As reinforcing members to reinforce the porous membrane, those that do not interfere with the permeability of the porous membrane, for example, a fabric, a non-woven fabric, a mesh, a net, a sponge, a foam, a foam material, and a porous material made of resin or metal are available. Such a reinforcing member can be joined to the porous membrane by a method using an adhesive or by means of heat welding or ultrasonic welding.

Meanwhile, the support body 27 can be made of resin or metal. However, by taking into account the ease of making it integral with the wall portion 131 that is made of resin, it preferably is made of resin. In order to withstand the use at high temperatures, examples of resin suitably used as the support body 27 include but are not limited to engineering plastic having heat-resistance, such as PBT (polybutylene terephthalate), ABS (acrylonitrile butadiene styrene), PS (polystyrene), PC (polycarbonate), and PVC (polyvinyl chloride). The support body 27 can be obtained by molding the foregoing resins, for example, by means of injection molding.

Figure 4:
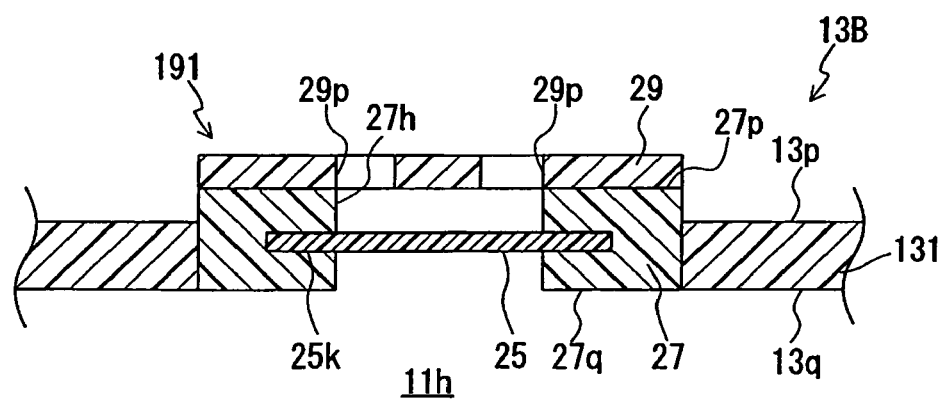
FIG. 4 is a cross section showing a modification of the ventilation filter part.

As with a housing upper portion 13B shown in FIG. 4, a lid 29 may be attached to the opening 27h of the support body 27. According to the ventilation filter part 191 having such a lid 29, it is possible to protect the ventilation filter 25 from foreign matter, such as dust and water droplets, in a reliable manner. Because the lid 29 is provided with ventilation holes 29p, it does not interfere with the permeability of the ventilation filter 25. The lid 29 may be attached to the support body 27 after the ventilation filter 25 and the support body 27 are made integral with the wall portion 131, or it may be made integral with the wall portion 131 by inserting the ventilation filter part 191 in a state where the lid 29 is attached to the support body 27 in a forming die. Examples of a method for joining the lid 29 to the top face 27p of the support body 27 include but are not limited to methods with the use of an adhesive and by means of heat welding and ultrasonic welding.

A method for manufacture of the housing 17 provided with a ventilation filter shown in FIG. 1 will now be described.

According to the method for manufacture described in this embodiment, the housing upper portion 13 including the ventilation filter 19 and the housing lower portion 15 are manufactured separately, and devices, such as the ECU main body 23, are fixed to the housing upper portion 13 or the housing lower portion 15 at the predetermined positions, after which the housing upper portion 13 and the housing lower portion 15 are joined to each other. The housing 17 provided with a ventilation filter is thus completed.

Before the housing upper portion 13 is manufactured, the ventilation filter part 19 is manufactured first. The ventilation filter part 19 shown in FIG. 1 through FIG. 3 can be manufactured by a so-called insert molding method, by which the ventilation filter 25 is inserted into a forming die used to mold the support body 27 made of resin. Alternatively, the same ventilation filter part 19 can be manufactured by a method in which two upper and lower ring-shaped mold articles that will be made into the support body 27 are manufactured first, and then the ventilation filter 25 is fixed to one of these mold articles, after which the two ring-shaped mold articles are joined to each other with an adhesive or the like so as to sandwich the peripheral portion 25k of the ventilation filter 25 from above and below with the inner peripheral portions of these ring-shaped mold articles.

Subsequently, an inspection is conducted on plural ventilation filter, parts manufactured in advance to discriminate between conforming articles and inferior articles, and the conforming articles alone are used as the ventilation filter part 19 used in the step of molding the housing upper portion 13. When configured in this manner, it is possible to eliminate the need to conduct an inspection after the housing upper portion 13 is manufactured. Accordingly, waste can be reduced to the least extent possible in the event of a problem, such as damage done on the ventilation filter.

An inspection conducted on the ventilation filter part 19 is, for example, a water resistance inspection in accordance with the B method (high-hydrostatic pressure method) of the water-proof test for textile products defined by the Japanese Industrial Standards (JIS) L 1092 (1998). To be more specific, for example, a water pressure of about 30 kPa is applied to the ventilation filter parts 19 fixed to a clamp or the like from the main surface side. Those in which no water leaks to the back surfaces of the ventilation filters 25 are determined as conforming articles having a water-proof sealing characteristic at a water-resistant pressure of 30 kPa or higher. The B method of the Japanese Industrial Standards (JIS) L 1092 (1998) is a destructive test, whereas the water resistance inspection in this embodiment is a non-destructive test performed at a pressure sufficiently lower than the breaking strength of the ventilation filter part 19. The water pressure is about 30 kPa in the description above. However, the value varies with the product grades.

A permeability inspection may be conducted on the ventilation filter parts 19. The permeability inspection can be conducted by a method in accordance with, for example, an air permeability test (Gurley) defined by the Japanese Industrial Standards (JIS) P 8117 or an air permeability test (Frazier) defined by the Japanese Industrial Standards (JIS) L 1096. In the permeability inspection, those exhibiting permeability as high as or higher than a pre-determined threshold value are judged as conforming articles. The permeability inspection described above can be conducted instead of the Water resistance inspection or together with the water resistant inspection.

Figure 5:
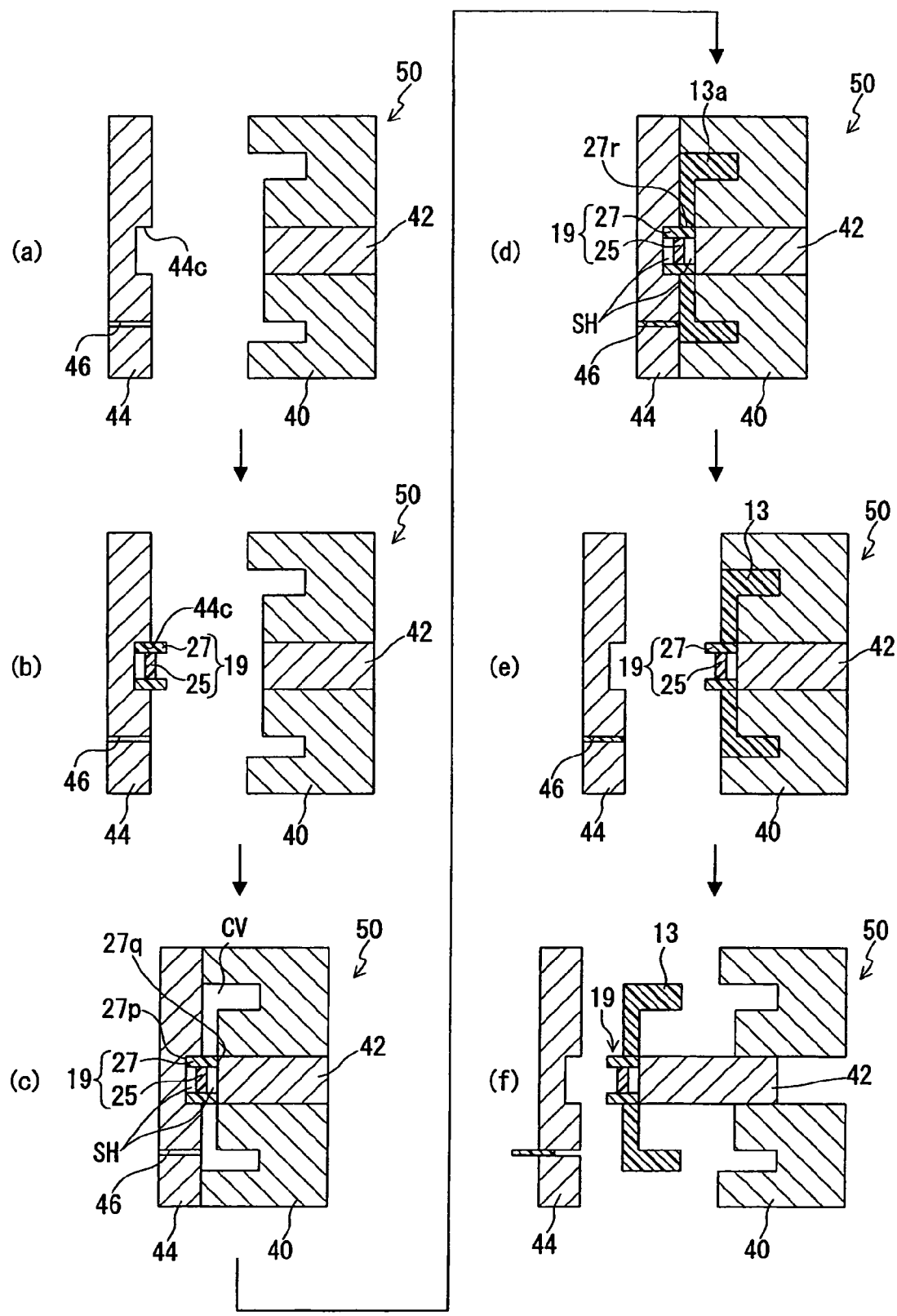
FIG. 5 is a view used to describe the sequence to manufacture a housing part provided with a ventilation filter (housing upper portion).

Subsequently, the housing upper portion 13 including the ventilation filter part 19 is manufactured by means of insert injection molding, by which resin is molded while the ventilation filter part 19 is disposed inside a forming die. FIG. 5 is a view used to describe the sequence to manufacture the housing upper portion 13. A forming die 50 used herein includes a movable die 40 and a stationary die 44. The movable die 40 has a protruding pin 42. The stationary die 44 is provided with a concave portion 44c in which the ventilation filter part 19 is fit for positioning as well as a gate 46 (FIG. 5(a)).

Initially, the ventilation filter part 19 is disposed in the concave portion 44c of the stationary die 44 (FIG. 5(b)). Subsequently, the movable die 40 is brought into close proximity to the stationary die 44 and these dies are clamped together (FIG. 5(c)). The forming die 50 is designed in such a manner that clearances SH and SH are defined above and below the ventilation filter 25 in a clamped state. Also, in order to prevent the resin from flowing into the clearances SH and SH, in other words, in order to prevent the resin from flowing over a ventilation region (a region exposed to the opening 27h of the support body 27) of the ventilation filter 25, the top and bottom faces 27p and 27q of the support body 27 come into close contact with the forming die 50. According to this method, the injected resin will not come into contact with the ventilation region of the ventilation filter 25 without having to protect the ventilation filter part 19 with an additional protecting film or the like. The risk of deteriorating the permeability of the ventilation filter 25 thus is eliminated.

Subsequently, resin 13a is injected into a cavity CV defined within the forming die 50 via the gate 46 (FIG. 5(d)). The resin 13a injected into the cavity CV surrounds the side face 27r of the support body 27 of the ventilation filter part 19 without any clearance and is thereby made integral with the support body 27. By taking into account that the housing 17 provided with a ventilation filter is used in a relatively hot environment, engineering plastic that is excellent in heat resistance, such as PBT, ABS, PS, PC, and PVC, is suitable as the resin 13a used for molding the housing upper portion 13 (resin forming the wall portion 131). It is more preferable that the type (composition) of resin used for the support body 27 of the ventilation filter part 19 is the same as the type (composition) of the resin 13a used for molding the housing upper portion 13. Because the compatibility is high between the same resins, it is possible to fix the ventilation filter part 19 firmly to the housing upper portion 13.

Even in a case where the type of resin of the support body 27 and the type of resin of the wall portion 131 are made different, by making the support body 27 from resin that is excellent in heat resistance, such as PBT, it is possible to use resin having a relatively high melting point and excellent in heat resistance for molding the housing upper portion 13. In addition, by making the ventilation filter 25 from fluorocarbon resin (for example, PTFE or the like) excellent in heat resistance, the risk of damaging the ventilation filter 25 can be eliminated even when the molding temperature is set relatively high.

When the resin has been injected into the cavity CV, the movable die 40 is released from the stationary die 44 to open the mold after an elapse of an appropriate cooling time (FIG. 5(e)). The housing upper portion 13 including the ventilation filter part 19 is pulled out from the forming die 50 by driving the protruding pin 42 (FIG. 5(f)). In this manner, the housing upper portion 13 as part of the housing 17 provided with a ventilation filter can be obtained. FIG. 5 shows an embodiment where the protruding pin 42 used to release the housing upper portion 13 abuts on the ventilation filter part 19 alone. In practice, however, it is preferable that the portions other than the ventilation filter part 19 are pushed out by the protruding pins at the same time. In addition, the protruding pin is not necessarily in contact with the ventilation filter part 19, and the protruding pin may be in contact with a portion other than the ventilation filter part 19 alone.

The housing lower portion 15 to be combined with the housing upper portion 13 manufactured as above is manufactured by a known injection molding method. After the devices, such as the ECU main body 23, are fixed to the housing lower portion 15 at the predetermined positions, the housing upper portion 13 and the housing lower portion 15 are joined to each other with the use of a sealing material or the like. The housing 17 provided with a ventilation filter whose interior is sealed hermetically and the ECU 11 equipped with the housing 17 are completed in this manner.

Assuming that the thickness direction of the ventilation filter 25 is the vertical direction, then it is desirable that the ventilation filter part 19 shown in FIG. 1 through FIG. 3 is almost vertically symmetric. When configured in this manner, it is possible to fit the ventilation filter part 19 into the concave portion 44c of the forming die 50 in either orientation without having to discriminate between the top and the bottom. This configuration therefore provides advantages that the workability is enhanced, the sequence is readily automated, and so forth.

Figure 13:
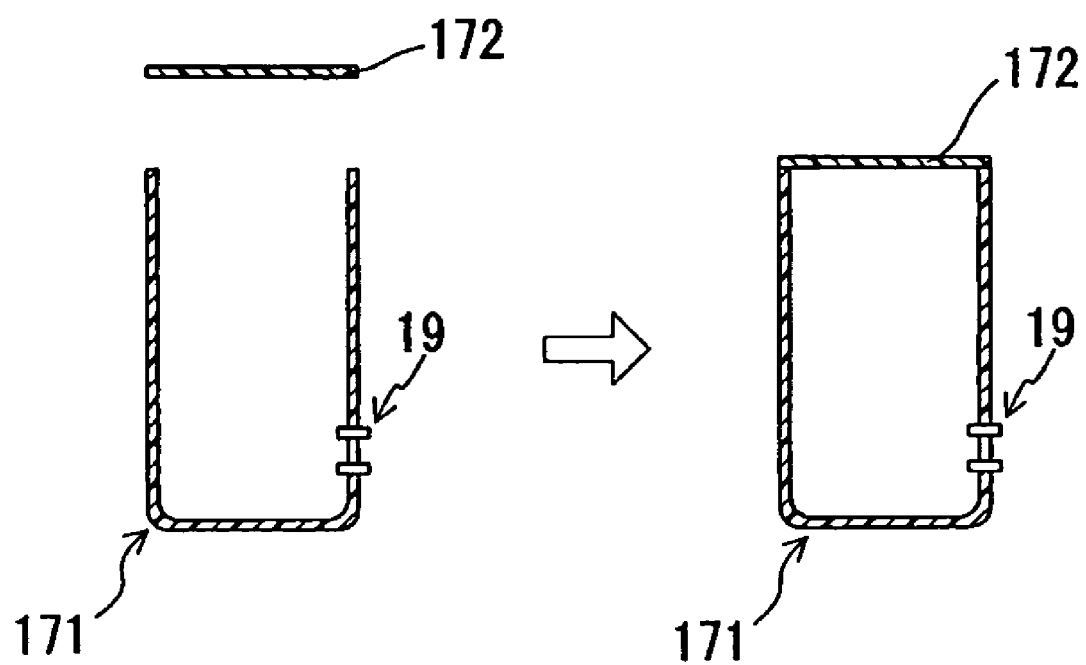
FIG. 13 is a cross section showing another embodiment of the housing provided with a ventilation filter.

Also, as is shown in FIG. 13, a housing provided with a ventilation filter may be obtained by manufacturing a bottomed cylindrical housing part 171 provided with a ventilation filter that includes the ventilation filter part 19 and by closing the opening of the housing portion 171 provided with a ventilation filter with a lid 172. It goes without saying that the ventilation filter part 19 can be made integral with the lid 172.

Second Embodiment

Figure 6:
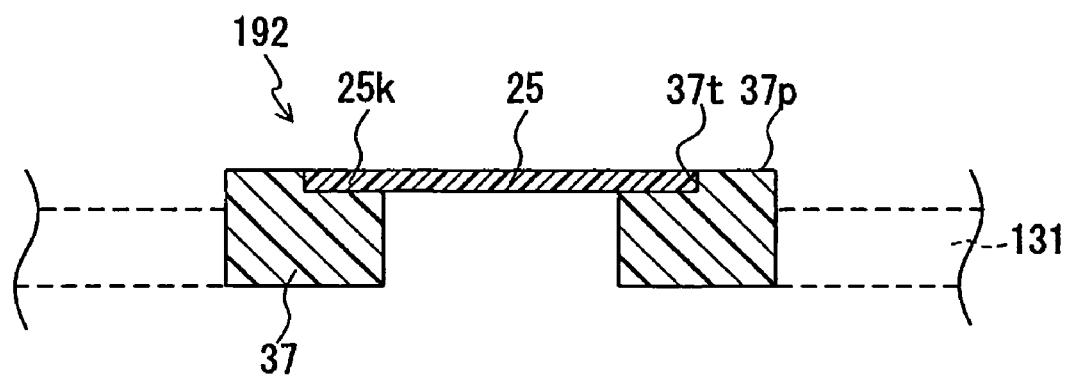
FIG. 6 is a cross section showing another embodiment of the ventilation filter part suitable for a method for manufacture of the invention.

The method for manufacture described with reference to FIG. 5 also can be performed using a ventilation filter part 192 as shown in FIG. 6. The ventilation filter part 192 shown in FIG. 6 includes a ventilation filter 25 and a support body 37 provided with a counterbore 37t having a depth almost equal to the thickness of the ventilation filter 25. The support body 37 made of resin is manufactured first, and the ventilation filter 25 then is fixed to the counterbore 37t of the support body 37. The ventilation filter part 192 as above has an advantage that it can be manufactured more easily than the ventilation filter part 19 of FIG. 1 through FIG. 3.

Figure 7:
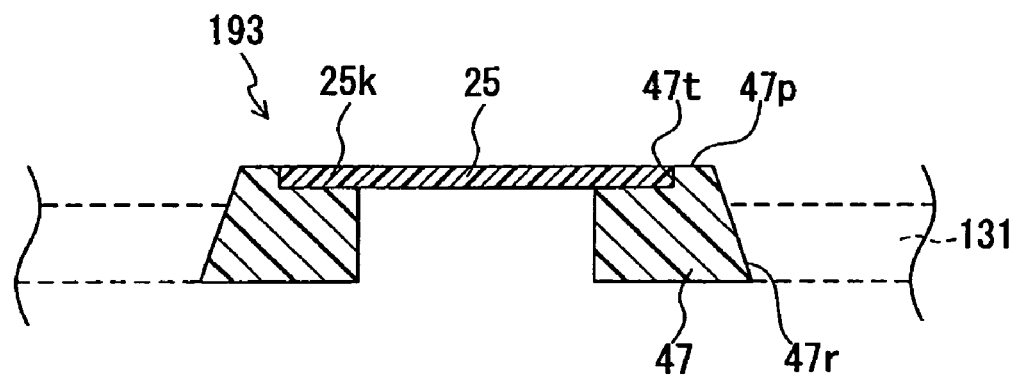
FIG. 7 is a cross section showing still another embodiment of the ventilation filter part.
Figure 8:
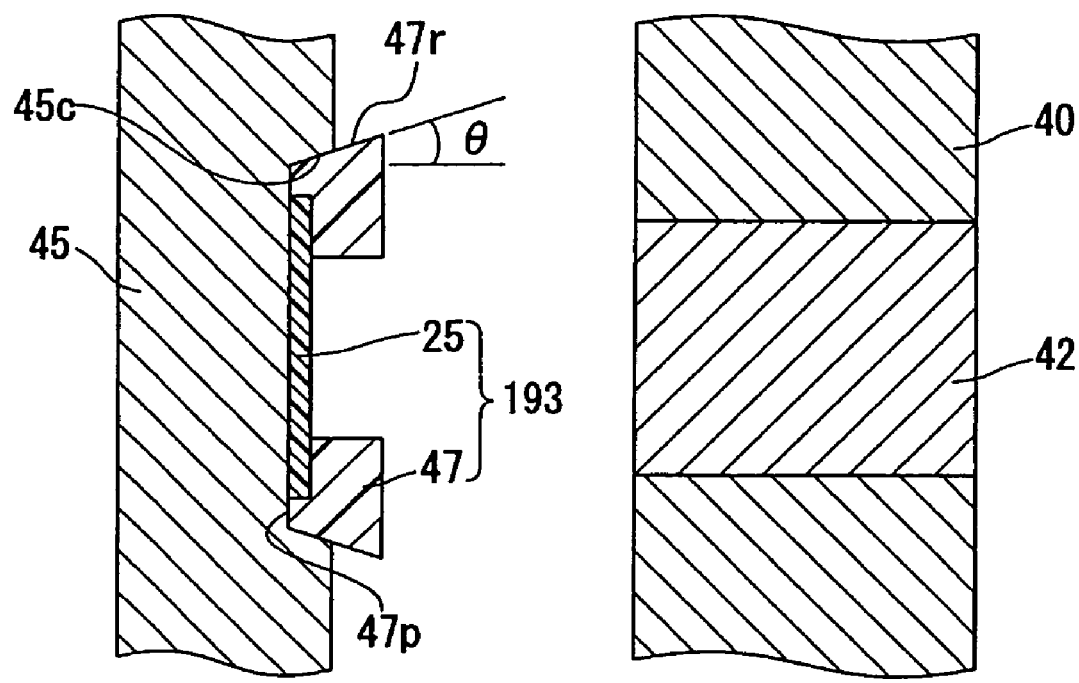
FIG. 8 is a cross section showing a state where the ventilation filter part of FIG. 7 is disposed in a forming die at a predetermined position.

The method for manufacture described with reference to FIG. 5 can be also performed using a ventilation filter part 193 as shown in FIG. 7. The ventilation filter part 193 shown in FIG. 7 is a modification of the ventilation filter part 192 described with reference to FIG. 6. To be more specific, as is shown in FIG. 7, the ventilation filter part 193 has a side face 47r of a support body 47 to which a taper is provided so as to incline by a specific angle with respect to the thickness direction of the ventilation filter 25 in a cross section parallel to the thickness direction of the ventilation filter 25. In order to obtain a housing upper portion in which the ventilation filter part 193 as above is made integral with the wall portion 131, as is shown in FIG. 8, a concave portion 45c of a forming die 45 is also provided with a taper at an angle $\theta$. When configured in this manner, because a joint area of the support body 47 and the housing upper portion can be larger, it is possible to increase the joint strength between the ventilation filter part 193 and the wall portion 131. The angle $\theta$ of the taper provided to the side face 47r of the support body 47 is adjusted as needed within a range larger than a release taper (for example, less than 1 degree) of normal injection molding and no larger than 45 degrees. The configuration to provide a taper to the side face of the support body may be applied to other embodiments.

In order to manufacture a housing upper portion in which the ventilation filter part 192 or 193 shown in FIG. 6 or FIG. 7, respectively, is made integral with the wall portion 131 by means of insert molding, it is recommended to make the depth of the counterbore 37t or 47t provided to the support body 37 or 47, respectively, almost equal to or slightly larger than the thickness of the ventilation filter 25. When configured in this manner, when the ventilation filter part 192 or 193 is disposed in the forming die and the forming die is clamped, there will be no clearance between the top surface 37p or 47p of the support body 37 or 47 of the ventilation filter part 192 or 193, respectively, and the forming die. The risk of letting the resin flow over the ventilation region of the ventilation filter 25 thus can be lowered.

Third Embodiment

Figure 9:
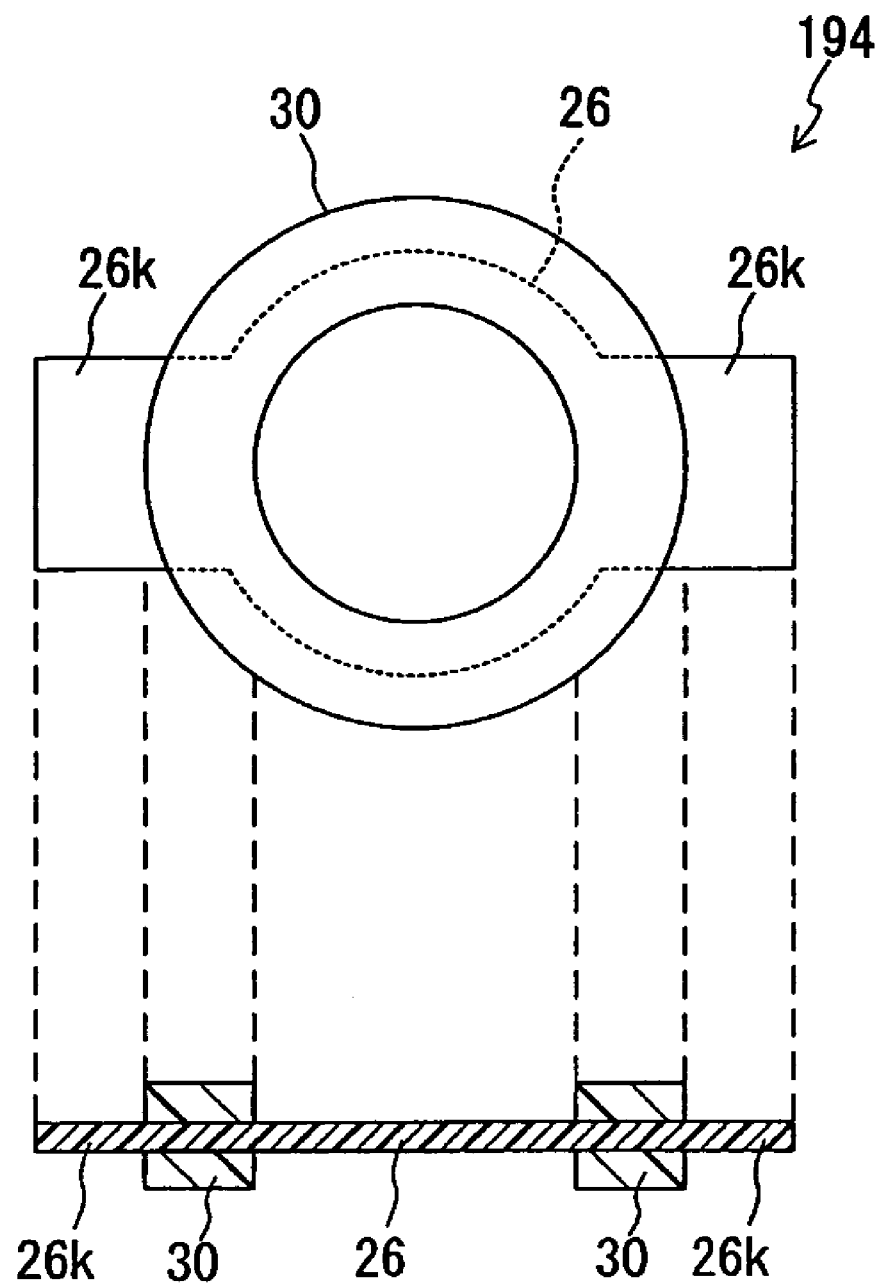
FIG. 9 is a plan view and a cross section showing still another embodiment of the ventilation filter part suitable to the method for manufacture of the invention.

The method for manufacture described with reference to FIG. 5 can be also performed using a ventilation filter part 194 shown in FIG. 9. The upper-row in FIG. 9 is a plan view and the lower-row is a cross section. The ventilation filter part 194 is formed in such a manner that in the in-plane direction perpendicular to the thickness direction of a ventilation filter 26, part of the peripheral portion 26k of the ventilation filter 26 protrudes more to the outer side than the outer periphery of the support body 30. However, as can be understood from the plan view, the rest of the peripheral portion of the ventilation filter 26 is embedded in the support body 30. Hence, the configuration is the same in that the ventilation filter 26 is fixed to the support body 30.

Figure 10:
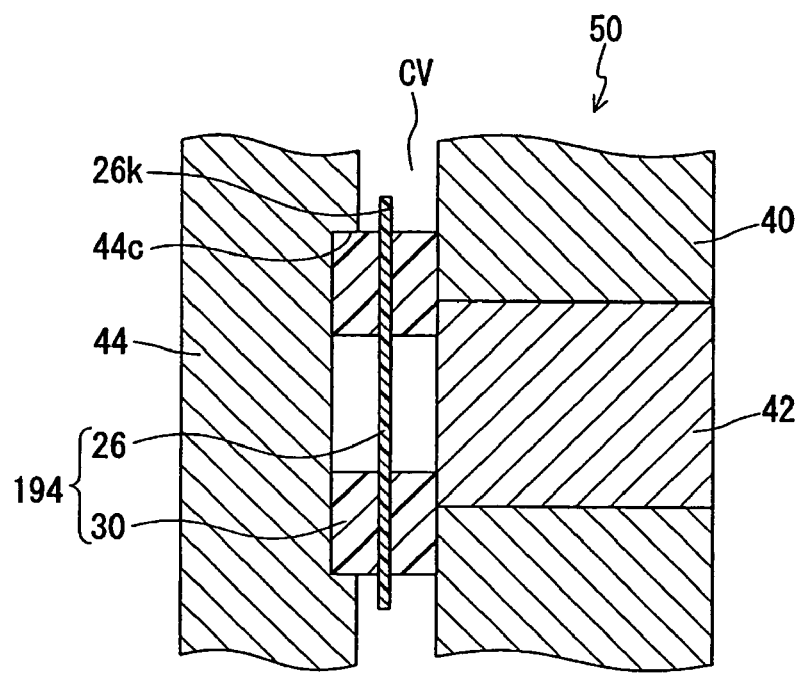
FIG. 10 is a cross section showing a clamped state while the ventilation filter part of FIG. 9 is disposed in a forming die at a predetermined position.
Figure 11:
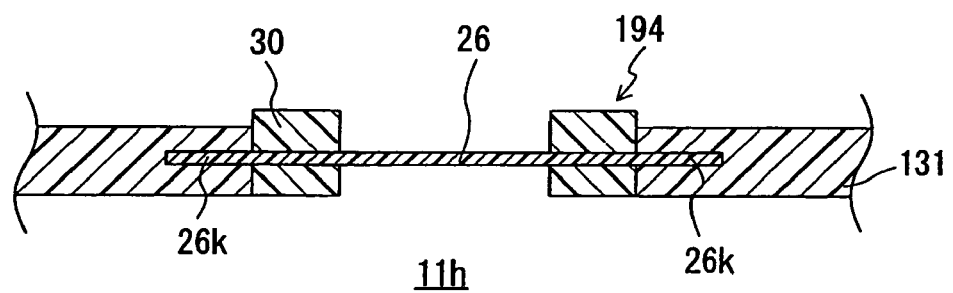
FIG. 11 is a cross section of a housing upper portion using the ventilation filter part of FIG. 9.

In order to manufacture a housing upper portion in which the ventilation filter part 194 as above is made integral with the wall portion 131 by means of insert molding, as is shown in FIG. 10, in a state where a forming die 50 is clamped, the peripheral portion 26k of the ventilation filter 26 protruding from the support body 30 is exposed within the cavity CV. Subsequently, resin is injected into the cavity CV, and the ventilation filter part 194 and the resin injected into the cavity CV are made into one piece in such a manner that the injected resin wraps around the peripheral portion 26k of the ventilation filter 26. When configured in this manner, it is possible to fix the ventilation filter 26 firmly for the ventilation filter 26 to bridge between the support body 30 and the wall portion 131 as is shown in FIG. 11.

Figure 12:
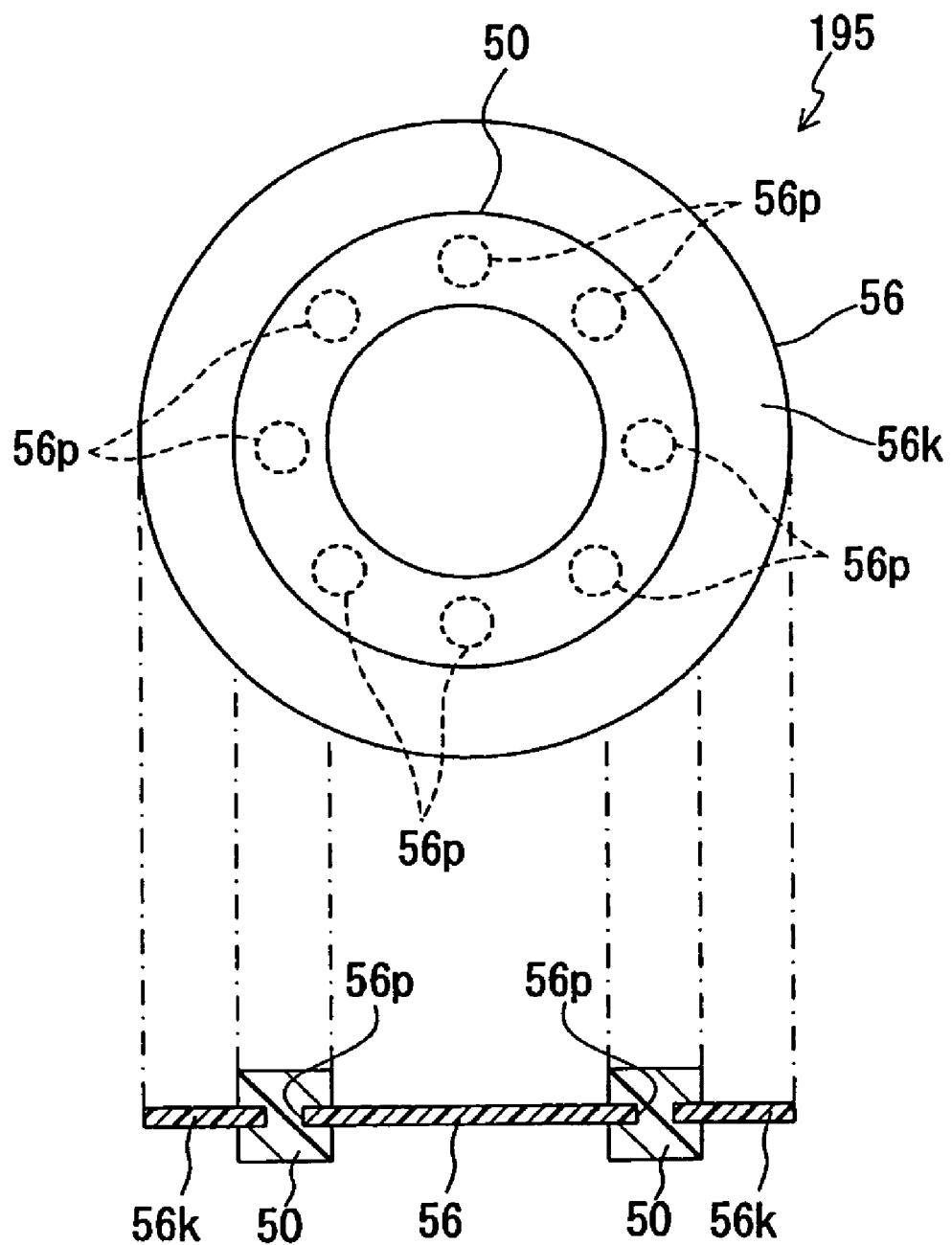
FIG. 12 is a plan view and a cross section showing a modification of the ventilation filter part of FIG. 9.

Alternatively, as is shown in the plan view of FIG. 12, it is possible to adopt a ventilation filter part 195 in which a ventilation filter 56 is fixed to a support body 50 by making through-holes 56p in the ventilation filter 56 in advance for part of the support body 50 to penetrate through these through-holes 56p. According to the ventilation filter part 195 as above, the peripheral portion 56k of the ventilation filter 56 protrudes more to the outer side than the outer periphery of the support body 50 along the entire area in the circumferential direction.

INDUSTRIAL APPLICABILITY

A housing provided with a ventilation filter for devices in an automobile, such as lamps, motors, sensors, switches, and ECUs, or electric devices, such as mobile communication devices, cameras, electric shavers, and electric toothbrushes, can be manufactured suitably by the method of the invention.

The invention claimed is:

1. A method for manufacture of a housing part provided with a ventilation filter, comprising:
    a step (A) of disposing a ventilation filter part including a support body and ventilation filter fixed to the support body in a forming die at a predetermined position and clamping the forming die; and
    a step (B) of injecting resin into a cavity defined within the forming die as a result of clamping to make the resin and the ventilation filter part into one piece and thereby molding a housing part formed of the ventilation filter part and the resin,
    wherein;
    the ventilation filter is in a form of a membrane and the support body is in a form of a frame to which a peripheral portion of the ventilation filter is fixed, a bottom face of the support body and an inner surface of the resin facing an interior of the housing part are almost flush with each other, and the forming die includes a concave portion in which the ventilation filter part is fit for positioning;
    in the step (A), the ventilation filter part is fit in the concave portion, the forming die is clamped in such a manner that the forming die comes into close contact with a top face, the bottom face and a part of a side face of the support body so as to prevent the resin from flowing over a ventilation region of the ventilation filter; and
    in the step (B), the support body being made integral with the resin only at a part of the side face of the support body that protrudes out from the concave portion and faces the cavity, the side face being defined between the top and bottom faces of the support body and being substantially linear when viewed in a vertical cross section of the support body.

2. The method for manufacture of a housing part provided with a ventilation filter according to claim 1, wherein:
    the support body is in a form of a frame that fixes the ventilation filter by sandwiching the peripheral portion thereof from above and below; and
    in the step (A), the forming die is clamped in such a manner that the forming die comes into close contact with the top and bottom faces of the support body so as to prevent the resin from flowing into clearances defined above and below the ventilation filter.

3. The method for manufacture of a housing part provided with a ventilation filter according to claim 1, wherein the support body is made of resin and a type of the resin used for the support body is the same as the type of resin used for the housing part.

4. The method for manufacture of a housing part provided with a ventilation filter according to claim 1, further comprising:
    a step (C) of discriminating between conforming articles and inferior articles by conducting an inspection on plural ventilation filter parts manufactured in advance,
    wherein the conforming articles discriminated in the step (C) alone are used as the ventilation filter part in the step (A) and (B).

5. The method for manufacture of a housing part provided with a ventilation filter according to claim 4, wherein the inspection conducted in the step (C) is a water resistance inspection.

6. The method for manufacture of a housing part provided with a ventilation filter according to claim 4, wherein the inspection conducted in the step (C) is a permeability inspection.

7. The method for manufacture of a housing part provided with a ventilation filter according to claim 1, wherein the ventilation filter includes a porous membrane made of polytetrafluoroethylene.

8. The method for manufacture of a housing part provided with a ventilation filter according to claim 1, wherein:
    the ventilation filter is formed in such a manner that in an in-plane direction perpendicular to a thickness direction of the ventilation filter, at least part of a peripheral portion of the ventilation filter protrudes more to an outer side than an outer periphery of the support body, and
    in a state where the forming die is clamped, the peripheral portion of the ventilation filter protruding to the outer side more than the outer periphery of the support body is exposed within the cavity while the resin and the ventilation filter part are made into one piece in such a manner that the resin injected into the cavity wraps around the peripheral portion of the ventilation filter.

9. A method for manufacture of a housing provided with a ventilation filter, comprising:
    manufacturing a housing part provided with a ventilation filter according to the method set forth in claim 1; and
    obtaining a housing provided with a ventilation filter by assembling the housing part provided with a ventilation filter and another housing part.

10. The method for manufacture of a housing part provided with a ventilation filter of claim 1, wherein:
    the side face of the support body is inclined with respect to a thickness direction of the ventilation filter in a cross section parallel to the thickness direction of the ventilation filter.

11. A method for manufacture of a housing part provided with a ventilation filter, comprising:
    a step (A) of disposing a ventilation filter part including a support body and a ventilation filter fixed to the support body in a forming die at a predetermined position and clamping the forming die; and
    a step (B) of injecting resin into a cavity defined within the forming die as a result of clamping to make the resin and the ventilation filter part into one piece and thereby molding a housing part formed of the ventilation filter part and the resin, wherein;

the ventilation filter is in a form of a membrane and the support body is in a form of a frame to which a peripheral portion of the ventilation filter is fixed, a bottom face of the support body and an inner surface of the resin facing an interior of the housing part are almost flush with each other, and the forming die is provided with a concave portion in which the ventilation filter part is fit for positioning;

in the step (A), the ventilation filter part is fit in the concave portion, the forming die is clamped in such a manner that the forming die comes into close contact with a top face, the bottom face and a part of a side face of the support body so as to prevent the resin from flowing over a ventilation region of the ventilation filter; and in the step (B), the support body being made integral with the resin only at a part of the side face of the support body that protrudes out from the concave portion and faces the cavity, the side face being defined between the top and bottom faces of the support body and being substantially parallel to a thickness direction of the ventilation filter.

12. A method for manufacture of a housing part provided with a ventilation filter, comprising:

a step (A) of disposing a ventilation filter part including a support body and a ventilation filter fixed to the support body in a forming die at a predetermined position and clamping the forming die; and a step (B) of injecting resin into a cavity defined within the forming die as a result of clamping to make the resin and the ventilation filter part into one piece and thereby molding a housing part formed of the ventilation filter part and the resin, wherein;

the ventilation filter is in a form of a membrane and the support body is in a form of a frame to which a peripheral portion of the ventilation filter is fixed, a bottom face of the support body and an inner surface of the resin facing an interior of the housing part are almost flush with each other, and the forming die is provided with a concave portion in which the ventilation filter part is fit for positioning;

in the step (A), the ventilation filter part is fit in the concave portion, the forming die is clamped in such a manner that the forming die comes into close contact with a top face, the bottom face and a part of a side face of the support body so as to prevent the resin from flowing over a ventilation region of the ventilation filter; and in the step (B), the support body being made integral with the resin only at a part of the side face of the support body that protrudes out from the concave portion and faces the cavity, the side face being defined between the top and bottom faces of the support body and being inclined with respect to a thickness direction of the ventilation filter and an inner peripheral surface of the support body is substantially parallel to the thickness direction of the ventilation filter.

* * * * *